Dec. 8, 1942.  E. A. KEELER  2,304,645
MEANS FOR INDICATING DEFECTS IN THREADS
Original Filed Dec. 29, 1936
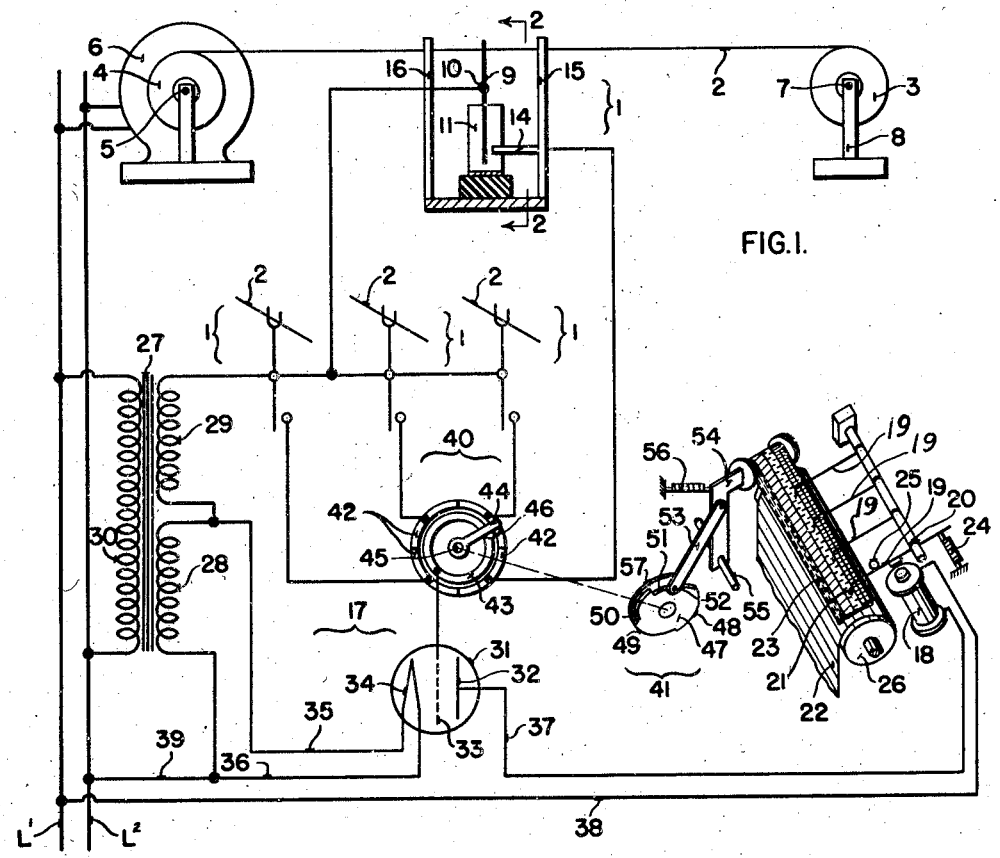
INVENTOR
EARL A. KEELER
BY *George M. Muchamp*
ATTORNEY Patented Dec. 8, 1942

2,304,645

UNITED STATES PATENT OFFICE 2,304,645

MEANS FOR INDICATING DEFECTS IN THREADS

Earl A. Keeler, Norristown, Pa., assignor to The Brown Instrument Company, Philadelphia, Pa., a corporation of Pennsylvania Original application December 29, 1936, Serial No. 118,095. Divided and this application November 23, 1938, Serial No. 241,997

5 Claims. (Cl. 73—51)

The present invention relates to multiple recording apparatus and more particularly to multiple recording apparatus having especial utility in the detection of defective filaments in a plurality of threads.

The present application is a division of my prior application Serial No. 118,095, filed December 29, 1936, which issued into Patent 2,188,754 on January 30, 1940, and discloses various arrangements for detecting defective filaments in a thread together with means actuated thereby for indicating and/or recording the number of such imperfections.

The various arrangements disclosed in my prior application were devised by me with the general object in view of providing simple and efficient means for detecting defective filaments in a single thread or in a plurality of threads together with means actuated thereby for indicating the presence and/or recording the number of such imperfections.

The apparatus claimed herein is an arrangement embodying my invention in which simple and efficient means are provided for detecting defective filaments in a plurality of threads, together with a single means responsive to the plurality of detection means for indicating the presence and/or recording the number of imperfections in the thread, the said single means being adapted to be controlled by each of the detection means in succession.

In the manufacture of fabrics from rayon or other threads the presence of broken filaments in the individual threads shows up in the finished material in the form of fuzzy ends. Heretofore in order to eliminate these fuzzy ends provisions have been made for the inspection by observation of a portion of the thread during transfer of the thread from spool to spool and rejection of any spools having an excessive number of broken filaments. This inspection operation is obviously expensive and, more important from the standpoint of producing quality material, is inadequate by virtue of the fact that only a small portion of the total output can practicably be inspected.

Moreover, visual inspection of the thread during transfer of the thread from spool to spool and detection of broken filaments is difficult as will be readily appreciated when it is understood that rayon threads which themselves are extremely small in diameter are made up from 40 to 100 or more of such filaments. By means of the arrangement claimed herein, the manual inspection operation referred to may be dispensed with and broken thread filaments may automatically be detected and indicated by readily distinguishable means.

In some textile inspection operations for detecting defective thread filaments, it may be sufficient to record only the imperfections in a portion of the thread on each of a number of spindles in order to obtain a reliable record of the state of perfection thereof and under such circumstances a reduction in the amount of equipment involved may be effected.

Accordingly, an object of my present invention is to provide simple and efficient apparatus for detecting defective filaments in a portion of the thread on each of a plurality of spindles together with a single means for recording in distinguishable manner the number of imperfections in that portion of each of the threads inspected, the said single means being adapted to be controlled by each of the detection means in succession.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Of the drawing:

Fig. 1 is a more or less diagrammatical view illustrating one form of the invention;

Fig. 2 is an end elevation of the contacting switch member shown in Fig. 1, shown as viewed in the direction of the arrows 2—2 of Fig. 1; and Fig. 3 illustrates a modification of the arrangement of Fig. 1.

Referring to Fig. 1 provision is made, as illustrated, for arranging an individual detector 1 in the path of each of a plurality of threads 2 for detecting the presence of defective filaments in the threads. Normally in practice each detector may desirably be arranged in the path of the thread as the latter is unwound from a spindle on a spinning machine and wound on a bobbin immediately after the spinning operation. For clarity and definiteness of illustration, however, I have shown, in a more or less diagrammatic way, the thread 2 as being unwound from a spool 3 and reeled on a spool 4, and in order not to confuse the drawing I have shown only one set of spools 3 and 4 and have only indicated schematically a number of other detectors 1 arranged in the path of a thread 2. The spool 4 is mounted for rotation on a shaft 5, which is driven through suitable gearing, not shown, by a unidirectional electrical motor 6 energized for rotation from alternating current supply lines L¹ and L². The spool 3 is mounted for rotation on a shaft 7 which may be disposed on suitable brackets 8 in any convenient manner. Preferably both spools 3 and 4 are so mounted for rotation as to facilitate quick removal and replacement by other spools.

Each detector 1 comprises a delicate switch mechanism including a contact arm 9 pivoted intermediate its ends for rotation on a light suspension wire 10, which may be of phosphor bronze or other suitable material, and disposed in the path of the thread. As best seen in Fig. 2, wire 10 is suspended between opposite arms of a U-shaped member 11 at the upper ends thereof. The arm 9 is provided at its upper end with a bifurcated portion or stirrup 12 which is so arranged that one arm of the stirrup is disposed on either side of the thread. The arms of stirrup 12 are separated by a distance slightly greater than the normal diameter of the thread so that any projecting portions of the latter resulting from broken filaments will engage one or the other or both of said arms. The other end of the arm 9, normally maintained in the position of Fig. 1 due to the torsion of wire 10, is adapted when engaged by broken filaments to engage a relatively fixed flexible contact element 13 disposed at right angles to the arm 9 and securely fastened at one end to a stationary rod member 14 which may be mounted in any suitable manner as for example on the rod 15. As broken filaments strike the stirrup 12 and rotate the arm 9 into engagement with the flexible contact 13, the suspension wire 10 sets up a resisting torque to thereby return the arm 9 to its normal position when the fuzz projections on the thread have passed on. The thread is guided into the stirrup 12 by guide rods 15 and 16 having saddle portions at their upper end for guiding the thread. The resiliency of contact 13 permits movement of the arm 9 to any position which may be taken by the latter. This is important to prevent injury to the thread or detector in the event that a knot or other unusually large projection from the thread engages the stirrup 12.

When the contacting arm 9 of a detector 1 is rotated into engagement with its flexible contact 13, a circuit including the contacts is adapted to be completed for applying an alternating current to the input side of an electronic device 17. An electromagnet 18 connected in the output circuit of the electronic device 17 is adapted to actuate an associated marker lever 19 pivoted at one end on a shaft 20. A print hammer 21, disposed on the other end of the member 19, is adapted to strike a recorder chart 22 through a multi-colored marker ribbon 23, and to thereby make a mark on the recorder chart each time that the electromagnet 18 is energized. As illustrated, a plurality of recorder elements 18 and 19 may be provided so that the imperfections detected by a plurality of groups of detectors may be recorded on a single record chart. The said plurality of groups of detectors are adapted to control a plurality of electronic devices 17, each of the latter having a relay winding 18 disposed in the output circuit thereof and associated elements 19, 20, 21, 22 and 23. Thus each marker lever 19 is arranged to be actuated by a plurality of detector elements through a distinct detecting switch 40, electronic device 14 and relay 18. Each member 19 is normally biased for rotation in a clockwise direction by spring means 24 into engagement with a stop 25 so that when the electromagnet 18 associated therewith is deenergized, the corresponding print hammer 21 is held out of engagement with the recorder chart 22 and ribbon 23. The recorder chart 22 is adapted to be driven by a continuously rotating roller 26, the latter being driven in any convenient manner, as for example, by a unidirectional electrical motor (not shown) so that any imperfections of each of the threads 2 will be recorded on the chart as a series of contiguous marks on a straight line.

The electronic device 17 includes a transformer 27 having secondary windings 28 and 29, and a primary winding 30 energized from the alternating current supply lines L¹ and L². The secondary winding 28 is employed to supply current for heating the filament of a three electrode thermionic tube 31, having the usual anode 32, grid 33 and cathode 34. The cathode 34 may be a filament type as shown, the filament terminals being connected by conductors 35 and 36 to the transformer winding 28. The anode 32 is connected by a conductor 37 to one end of the electromagnet 18 and the other end of the relay winding is connected by a conductor 38 to the alternating current supply line L¹, the anode circuit being completed by a conductor 39 connecting one end of the transformer secondary winding 28 to the alternating current supply line L². The cathode 34 is connected to one end of the secondary winding 29, and the remaining end of the latter is connected to all of the contacting arms 9 of the detectors 1. To effect cooperation of each individual detector 1 with the common recorder means, a rotary switch 40 and a cam operated mechanism 41 are provided for successively connecting the grid 33 to each of the detectors 1 and for simultaneously moving a different colored section of the multi-colored marker ribbon 23 under the print hammers 21, respectively.

In operation, when defective thread filaments strike the stirrup 12 of the detector 1 then connected to the grid 33, a circuit will be completed from the latter to the cathode 34 through the winding 29 to thereby impress an alternating potential between the grid and cathode. The operation of the electronic tube 31 is such that, when the arm 9 is out of engagement with the flexible contact 13, negligible current will flow in the anode circuit due to the accumulation of negative charges on the grid 33 and the relay winding 18 will be deenergized. When an alternating potential is applied on the grid 33, however, pulsating current will flow in the anode circuit of tube 31 and the electromagnet 18 will be energized. Thereupon, the associated lever 19 will be attracted to cause the print hammer 21 to strike the chart 22 through the corresponding section of the multi-colored ribbon 23 to make a mark thereon. Thus, actuation of each detector 1 by defective filaments in each of the corresponding threads will result in a mark of corresponding color being made on the record chart 22 so that a readily distinguishable record of the number of imperfections in each thread is had.

The rotary switch 40 referred to above includes a plurality of arcuate segments 42 which are insulated from each other in any suitable manner, a conducting ring 43 insulated from each of the arcuate segments, and a distributor arm 44 mounted on a shaft 45. The distributor arm 44 is provided with a brush 46 insulated therefrom and adapted to connect the arcuate segments 42 in succession with the conducting ring 43. The shaft 45 is rotated in a counter-clockwise direction in a suitable manner at uniform speed and connects each detector 1 successively with the electronic device 17 and associated recording means 19.

The cam operated mechanism 41 referred to above for moving a different colored section of the multi-colored ribbon 23, under the print hammers 21 includes a cam 47 which is mounted for rotation with the shaft 45 and is integral therewith. The cam 47 is so configured as to provide edge segments 48, 49, 50 and 51 which are adapted to cooperate with a roller 52 on one end of an arm 53. The arm 53 is rigid with a ribbon guide roll lever 54 which is pivoted for rotation on a shaft 55 and is biased for rotation in a counter-clockwise direction by spring means 56 so that the roller 52 on the end of the arm 53 is held into engagement with the edge of the cam 47. A disc 57 mounted for rotation with the shaft 45 and integral with the cam 47 is provided for guiding the roller 52 in order to prevent the latter from sliding off the edge of the cam. If desired, two such discs 57 on opposite sides of the cam may be employed for this purpose.

As seen in Fig. 1, when the cam 47 rotates in the counterclockwise direction, the roller 52 will engage and then leave the province of edge segments 48, 49, 50 and 51 in succession to impart a series of rotational impulses in the counter-clockwise direction to the lever 54 and thereby move the various sections of the multi-colored ribbon 23 under the print hammers 21 in succession. At the end of one complete cycle of rotation of the cam 47, the roller 52 will engage a rise portion on the edge of the cam between the segments 48 and 51 to thereby quickly move the ribbbon 23 to an extreme position towards the right. The extreme section of the ribbon 23 to the left as seen in Fig. 1 will then be disposed under the print hammers 21 and the system will be ready for the start of a new cycle. As the distributor brush arm 46 of the rotary switch 40 moves from one arcuate segment to the next, the next succeeding detector 1 will be connected to the grid 33 of the electronic device 17 and simultaneously the correspondingly colored section of the ribbon 23 will be moved under the print hammers 21 so that imperfections in each of the individual threads will be recorded in marks of identifying color and, therefore, will be readily distinguishable.

In Fig. 3 I have illustrated a modification of Fig. 1 in which individual detector and recorder means are provided for each of a plurality of threads and a common amplifier 17 is provided for all of the units. The imperfections in each of the threads will then be recorded on separate straight lines as a series of contiguous marks. In order to effect cooperation of the individual detector 1 with its corresponding recorder means 19, I provide two rotary switches 40 and 58 mounted on the same shaft for successively connecting in synchronism the grid 33 of the tube 31 to each of the detectors 1 and the anode 32 to each of the electromagnets 18, respectively. The rotary switch 58 may be similar in construction to the rotary switch 40, and includes a plurality of arcuate segments 59, a conducting ring 60 and a distributor arm 61 mounted on the shaft 45 for rotation therewith. Each of the arcuate segments is connected to one end of each of the windings of the electromagnets 18 by a conductor 62, the other ends of the relay windings being connected together and to the alternating current supply line $L^1$ by a conductor 63. The conducting ring 60 is connected to the anode 32 of the electronic tube 31 by a conductor 64 so that as the detectors 1 are successively connected to the grid 33, a corresponding electromagnet 18 and its associated recording elements are simultaneously connected to the anode 32 for recording the imperfections in the thread detected by the detector 1 then connected to the grid.

For convenience, in reading the record chart at the end of the inspection operation, the print hammers 21, as seen in Fig. 1 may be staggered, and the means described in Fig. 3 may be employed in conjunction therewith to record the imperfections in each of a plurality of threads by different colored contiguous marks, the marks in any one line, and hence, for any individual thread, being of the same color.

While in accordance with the provisions of the statutes, I have illustrated and described the best form of my invention now known to me, it will be apparent to those skilled in the art that certain changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. A multiple control apparatus comprising in combination an electronic valve having an anode, grid and a cathode, a plurality of detectors each of which is adapted to be connected to said grid to vary the potential of the latter relatively to the potential of said cathode, control means having a connection with said anode and cathode and having a plurality of operating positions said control means being continuously operative in each of its operating positions to effect a control operation, and switching means adapted to connect said detectors individually to said grid in succession and to adjust said control means to each of its operating positions in succession in accordance with the detector connection.

2. In multiple recording apparatus comprising in combination an electronic valve having an anode, a grid and a cathode, a plurality of detectors each responsive to an individual one of a plurality of variable characteristics to be recorded, each of said detectors being adapted to be connected to said grid to vary the potential of the latter relatively to the potential of said cathode, recording means having a plurality of recording conditions and having a connection with said anode and a cathode, said recording means being continuously operative in each of its operating conditions to effect a recording operation, and switching means adapted to connect said detectors individually to said grid in succession and to adjust said recording means to each of its recording conditions in succession in accordance with the detector connection.

3. In apparatus for ascertaining the number of imperfections in a plurality of threads due to defective filaments, an electronic valve having an anode, a grid and a cathode, a plurality of detectors each disposed in cooperative relation with an individual thread, each of said detectors being adapted to be connected to said grid to vary the potential of the latter relatively to the potential of said cathode, means for relatively moving each thread and respective detector, recording means having a plurality of recording conditions and having a connection with said anode and cathode, and switching means adapted to connect said detectors individually to said grid in succession and to adjust said recording means to each of its recording conditions in succession in accordance with the detector connection.

4. In apparatus for ascertaining the number of imperfections in a plurality of threads due to defective filaments, an electronic valve comprising an anode, grid and a cathode, a source of alternating current voltage for said valve, a plurality of detecting means each disposed in cooperative relation with an individual thread, each of said detecting means being adapted to be connected to said grid to vary the potential of the latter relatively to the potential of said cathode, means for relatively moving each thread and respective detecting means, a plurality of recording means each individual to one of said threads, means for successively connecting each of said recording means in the anode circuit of said electronic valve, and means for simultaneously connecting each of said detecting means in succession in the grid circuit of said electronic valve for controlling the flow of anode current through said valve under control of the defective filaments of one of said threads when the detecting and recording means individual thereto are connected in said circuits.

5. Multiple control apparatus comprising in combination an electronic valve having an anode, grid and a cathode, a plurality of physically actuatable detectors each of which is adapted to be connected to said grid to vary the potential of the latter relatively to the potential of said cathode, control means having a connection with said anode and cathode and having a plurality of operating positions, said control means being continuously operative in each of its operating positions to effect a control operation, and switching means adapted to connect said detectors individually to said grid in succession and to adjust said control means to each of its operating positions in succession in accordance with the detector connection.

EARL A. KEELER.